Patented June 22, 1937

2,084,977

UNITED STATES PATENT OFFICE 2,084,977

MOTOR FUEL PRODUCTS

Thomas H. Rogers and Vanderveer Voorhees, Hammond, Ind., assignors, by mesne assignments, to Gasoline Antioxidant Company, Wilmington, Del., a corporation of Delaware No Drawing. Application March 26, 1937, Serial No. 133,187

2 Claims. (Cl. 44—9)

This invenion relates to the stabilization of motor fuels and particularly to the stabilization of cracked gasolines which tend to deteriorate and develop gums.

In particular, the present invention relates to the treatment of highly cracked gasolines or hydrocarbon motor fuel distillates of the type which are normally unstable, particularly with respect to gum formation on storage, and which, having an initial anti-knock rating superior to that of straight-run gasoline, tend to deteriorate in anti-knock rating.

The tendency of products of this type to develop gum forming constituents, is indicated, for example, by their oxygen absorption induction period, determined, for example, as described in the article by Voorhees and Eisinger in Proceedings of the American Petroleum Institute, Section 2, January 3, 1929, page 170. The oxygen absorption induction period is the period of time for which the rate of absorption of oxygen by a 100 cc. sample of motor fuel maintained in a liter flask at an elevated temperature of 210–212° F. in an atmosphere of oxygen under about 1.5 to 2 atmospheres pressures remains below 1 cc. per minute.

It has been customary to treat motor fuels of the type indicated above with substances such as strong sulphuric acid, fuller's earth and the like to remove these gum-forming constituents. Such treatments remove a substantial amount of the unsaturated constituents in the gasoline. Since these unsaturated constituents are partly responsible for the high anti-knock properties of cracked gasoline, it is apparent that such treatment destroys some of the desirable qualities of cracked gasolines. In addition, these treatments result in a loss in volume of motor fuel.

The object of the present invention is to provide a new class of organic materials that may be added to these gum-forming cracked gasolines, in small amounts, to inhibit or substantially retard the formation of gum therein. The amount of these gum inhibitors employed to stabilize a cracked gasoline will vary with the particular cracked gasoline to be treated but, in general, the amount of the inhibitor used will vary from 0.01 to 0.001%. With some motor fuels, the amount used will be as low as 0.0006%. Even in these small concentrations, the class of inhibitors herein disclosed have proven to be very effective as gum inhibitors in cracked gasoline.

Our present invention relates to the use of ortho-, meta-, and para-butyl aminphenols as gum inhibitors for cracked gasolines. In other words, these inhibitors are aminophenol wherein one amino hydrogen has been substituted by a butyl group, particularly the normal butyl radical. The corresponding secondary butyl, tertiary butyl and iso-butyl aminophenols may also be used. In addition, the benzene ring of the compound may be substituted with hydrocarbon radicals such as the methyl, ethyl and propyl radicals.

To illustrate the effectiveness of the above mentioned compounds, 0.002% of para-n-butyl aminophenol was added to a cracked gasoline having an initial induction period of 250 min, and it was found that this amount of the inhibitor raised the induction period to 875 minutes. In addition, these inhibitors do not develop objectionable color in the treated gasoline even upon exposure to sunlight.

In addition to using the compounds indicated above as gum inhibitors in cracked gasoline, these agents may be used in blends of motor fuels containing substantial amounts of gum-forming cracked gasoline. In using the above mentioned compounds to retard gum formation in cracked gasolines, we prefer to add the inhibitor to fresh gasoline or prior to the formation of gum.

This application is a continuation-in-part of our co-pending application Serial 427,416, filed February 10, 1930.

We claim:

1. A motor fuel product comprising cracked hydrocarbon distillates of the character of gasoline which normally tend to deteriorate and develop gum, said product containing a small proportion of aminophenol wherein one amino hydrogen has been substituted by a butyl radical, in quantities sufficient to retard such gum formation.

2. The method of preserving cracked hydrocarbon distillates of the character of gasoline which normally tend to develop gum on storage, which comprise incorporating therein a small proportion of aminophenol wherein one amino hydogen has been substituted by a butyl radical.

THOMAS H. ROGERS.
VANDERVEER VOORHEES.